July 30, 1968
J. A. LOWRY
3,394,816
SLUDGE COLLECTOR FLIGHT
Filed March 6, 1967
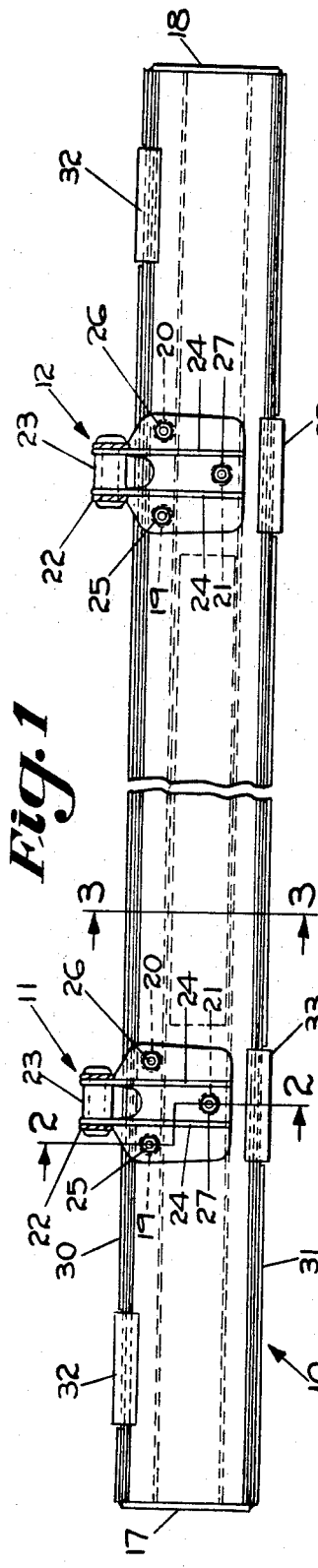
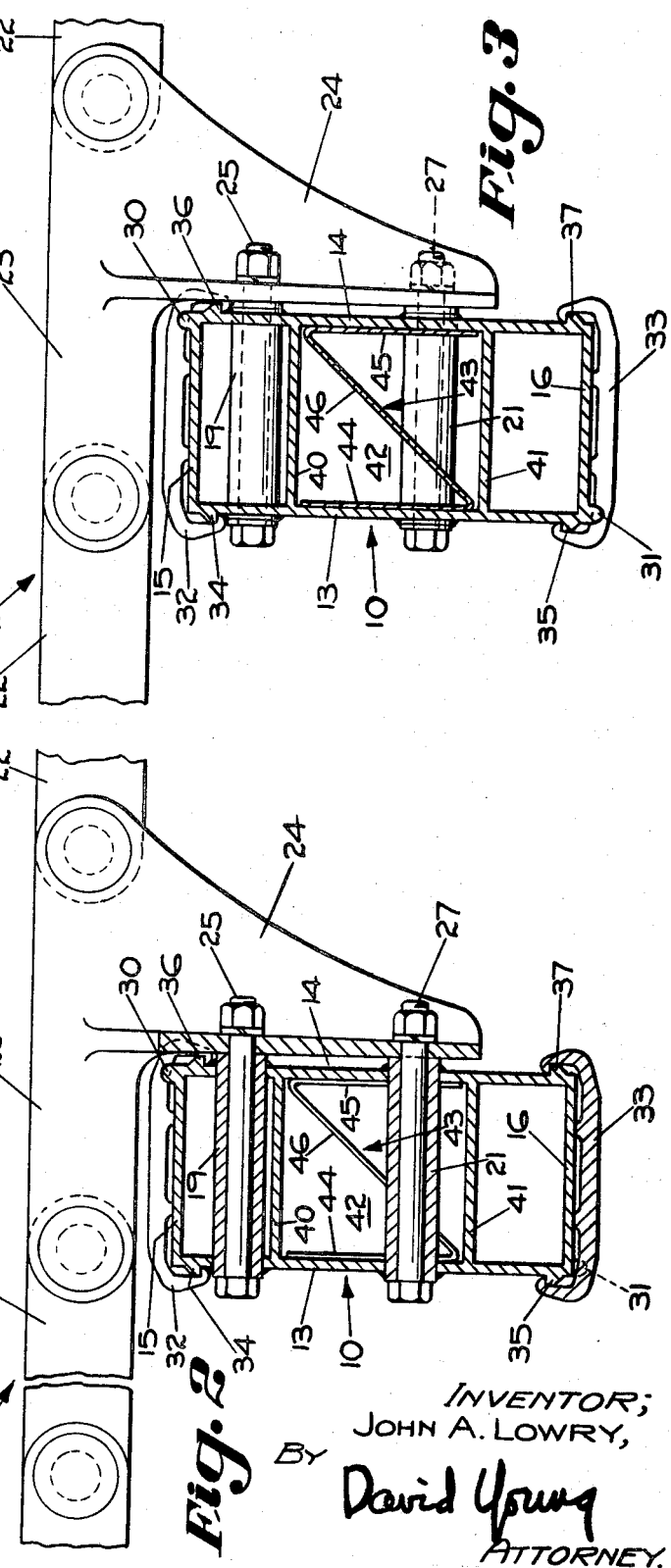
INVENTOR;
JOHN A. LOWRY,
By David Young
ATTORNEY.

United States Patent Office 3,394,816
Patented July 30, 1968

3,394,816
SLUDGE COLLECTOR FLIGHT
John A. Lowry, Columbus, Ohio, assignor to Jeffrey Galion Manufacturing Company, a corporation of Ohio
Filed Mar. 6, 1967, Ser. No. 620,833
5 Claims. (Cl. 210—525)

ABSTRACT OF THE DISCLOSURE

A hollow-walled sludge collector flight for settling tanks of sewage treatment plants including an elongated support member therein having a pair of upright legs abutting the upright walls of the flight and joined by a transverse leg.

---

The instant invention relates to sludge collector flights, and more particularly to an improved construction of such flight, which is self-supporting.

In the settling tanks of sewage treatment plants, sludge collectors are utilized to scrape the settled sludge from the bottom of the tank, and also, to skim the floatable wastes from the surface of the body of liquid in the tank. Such sludge collectors include transverse flights which are carried on chains and moved by such chains over the bottom of the tank and along the surface of the flight to perform the scraping and skimming functions. The sludge collector flights are usually of considerable length, and extend across the width of the settling tank. The chains for carrying and moving the flights are usually secured to the flights near the ends of the latter, so that there is a substantial unsupported length of the flight between the chains. It is desired that the flight be maintained in a straight condition along its full length, in order to most efficiently perform the scraping and skimming functions. Accordingly, it is necessary to prevent any sagging of the flight in the unsupported length of the flight between the chains which carry the flight.

It is therefore an object of this invention to provide an improved sludge collector flight which is self-supporting so that it will maintain a straight condition along its entire length.

It is another object of this invention to provide a sludge collector flight which includes self-supporting means for the flight in order to prevent bending or sagging of the flight.

It is still another object of the instant invention to provide a sludge collector flight of a hollow walled construction with self-supporting means therein for maintaining the flight in a straight condition.

It is also an object of the invention to provide self-supporting means for a sludge collector flight which is operative in both the upright and lateral transverse directions to maintain the flight in a straight condition in the longitudinal extent of the flight.

Other objects of the invention will appear hereinafter, the novel features and combinations being set forth in the appended claims.

In the drawings:

FIG. 1 is an elevational view of a sludge collector flight, constructed in accordance with this invention;

FIG. 2 is a sectional view of the sludge collector flight, taken on the line 2—2 in FIG. 1; and FIG. 3 is a sectional view of the sludge collector flight, taken on the line 3—3 in FIG. 1.

Referring to the drawings, the sludge collector flight 10 is an elongated member which is secured to a pair of endless chains 11, 12, to be carried by the chains and to be moved by the chains through the body of liquid in a settling tank of a sewage treatment plant. The sludge collector flight 10 is moved over the bottom of the settling tank to scrape the settled sludge from the bottom of the tank and across the surface of the liquid in the settling tank to skim the floatable wastes from the liquid surface.

The sludge collector flight 10 is formed by upright walls 13, 14, which are parallel and are laterally spaced. There are also an upper wall 15 and a lower wall 16, which are parallel and spaced. The upper and lower walls 15, 16 connect to the upright walls 13, 14 to form the sludge collector flight 10 with a rectangular cross-section configuration. The opposite ends of the sludge collector flight 10 are closed and sealed by end caps 17, 18, which are heat welded to the upright walls 13, 14 and to the upper and lower walls 15, 16.

The sludge collector flight 10 is preferably formed of a plastic material, such as polyvinyl-chloride plastic, which is impervious to the liquid and is inert so as not to be affected by any of the materials which might be in the liquid in the settling tank. Thus, the sludge collector flight 10 is formed as a buoyant body. However, the weight of the chains 11, 12 is greater than the buoyant force of the flight 10, and accordingly, holds the flight 10 on the rails at the bottom of the settling tank and on the rails near the top of the body of liquid in the settling tank, such that the sludge collector flight 10 will properly perform its scraping and skimming functions, respectively.

At the position on the sludge collector flight 10 at which the chain is secured to the flight 10, there are three tubes 19, 20, 21, which extend through the upright walls 13, 14 and are secured to the latter by heat welding to provide a fluid tight joint between tubes 19, 20, 21 and the upright walls 13, 14. The several tubes 19, 20, 21 are preferably made of the same material as the sludge collector flight 10. The endless chain 11 includes a plurality of regular chain links 22, and at each of a number of spaced positions along the chain there is a special chain link 23 which has a dependent bracket 24 that is placed adjacent to the ends of the tubes 19, 20, 21 for the reception of a plurality of bolts 25, 26, 27, which extend through tubes 19, 20, 21, thereby to secure the sludge collector flight 10 to the chain 11. The endless chain 12 is constructed in the same manner as the endless chain 11 and is secured to the sludge collector flight 10 in the same manner, and the same reference numerals are used for corresponding parts.

An integral rib 30 extends along the upper wall 15, and a similar integral rib 31 extends along the lower wall 16. The upper rib 30 is cut away to form a slot for the reception of an upper wear shoe 32, and the lower rib is similarly cut away to form a slot for the reception of a lower wear shoe 33. The wear shoes 32, 33 ride on rails within the settling tank and support the sludge collector flight 10 on such rails, thereby to reduce the wear on the flight 10. By placing the wear shoes 32, 33 in the slots of the ribs 30, 31, respectively, the wear shoes 32, 33 are held in place in the longitudinal direction.

The upright wall 13 has upper and lower beveled ribs 34, 35, which extend in the longitudinal direction, and the upright wall 14 has like beveled ribs 36, 37, which extend in the longitudinal direction. The wear shoes 32, 33 are formed with lips which snap over the beveled ribs 34, 35, 36, 37, respectively, thereby to secure the wear shoes 32, 33 on the upper wall 15 and on the lower wall 16, respectively.

Within the sludge collector flight 10 there is an upper transverse panel 40 and a lower transverse panel 41, which are parallel and spaced, and extend between the upright walls 13, 14. The portion of the sludge collector flight 10 comprising the upright walls 13, 14, the upper and lower walls 15, 16 and the transverse panels 40, 41, may be formed as an extrusion of the plastic material.

In such construction, the several walls 13, 14, 15, 16 and the panels 40, 41 are integral with each other. Also included in such integral construction are the several longitudinal ribs 30, 31, 34, 35, 36, 37. Thus, there is an inner chamber 42 that has a parallelogram configuration that is formed within the sludge collector flight 10 between the transverse panels 40, 41.

The self-supporting means for the sludge collector flight 10 is disposed within the inner chamber 42. The self-supporting means is an elongated rigid element 43, which may be formed of metal and extends in the longitudinal direction of the sludge collector flight 10 in the chamber 42 between the endless chains 11, 12, and substantially closely fits the inner chamber 42 in the transverse aspect thereof, as seen in FIGS. 2 and 3. The rigid element 43 has one upright leg 44 that is parallel to the upright wall 13 and is placed against the latter. There is another upright leg 45 that is parallel to the upright wall 14 and is placed against the latter. A transverse leg is obliquely disposed in the inner chamber 42 and extends from the lower end of the upright leg 44 to the upper end of the upright leg 45. The rigid element 43 is rigid in both the upright and lateral transverse directions, and accordingly, supports the sludge collector flight 10 in both directions to maintain the latter straight in the longitudinal direction along its length. The self-supporting means, comprising the rigid element 43, is sealed within the flight 10 and the inner chamber 42, and therefore, it is not affected by the liquid in the settling tank or by any of the materials that may be in the liquid.

Thus, the sludge collector flight 10 constructed in accordance with this invention will be maintained in a straight condition along its length by the self-supporting means that is placed within the sludge collector flight. Inasmuch as the self-supporting means is sealed within the flight 10, it may be expected to last as long as the flight itself, and there will be no diminishment of its effectiveness to suppport the flight 10 in its straight condition.

Obviously those skilled in the art may make various changes in the details and arrangement of parts without departing from the spirit and scope of the invention as defined by the claims hereto appended, and applicant therefore wishes not to be restricted to the precise construction herein disclosed.

Having thus described and shown an embodiment of the invention, what it is desired to secure by Letters Patent of the United States is:

1. A sludge collector flight for a sewage collection tank contaiinng a body of liquid in which said flight scrapes the bottom of the tank to remove settled sludge and skims the surface of the body of liquid to remove floatable sludge, said flight being elongated and comprising spaced walls to form said flight as a closed hollow member that is buoyant in said body of liquid, said spaced walls of said flight include spaced upright walls, spaced upper and lower walls connected to said upright walls, spaced end walls connected to said upright walls and to said upper and lower walls, self-supporting means for said flight comprising an elongated element that is placed within said flight and is disposed longitudinally in said closed hollow member, said elongated element of said self-supporting means has one upright leg that is abutting against one of said upright walls on a substantial portion of the upright wall and another upright leg that is abutting against another of said upright walls on a substantial portion of the upright wall to support the flight in the upright direction, at least one transverse leg that extends between said upright legs and is connected at the opposite ends of the upright legs to support the flight in the transverse direction, said upright legs being rigid in the upright direction and said transverse leg being rigid in the transverse direction, and means to maintain said elongated element in a predetermined position in said flight.

2. A sludge collector flight as recited in claim 1 in which said transverse leg is disposed obliquely between said one upright leg and said another upright leg.

3. A sludge collector flight as recited in claim 1 in which said spaced upright walls of said flight are parallel to each other, and said elongated element has said one upright leg placed against one of said spaced upright walls and said another upright leg is placed against another of said spaced upright walls such that said upright legs are parallel to each other.

4. A sludge collector flight as recited in claim 1 in which there is an upper intermediate panel that is disposed transversely between said spaced upright walls, a lower intermediate panel that is disposed transversely between said spaced upright walls, and said elongated element of said self-supporting means being disposed between said upper and lower intermediate panels.

5. A sludge collector flight as recited in claim 4 in which said spaced upright walls are parallel to each other, said upper and lower intermediate panels are parallel to each other, said elongated element has said one leg placed against said one upright wall and said another leg placed against said another upright wall and between said upper and lower intermediate panels, and said transverse leg of said elongated element extends obliquely from the bottom of said one leg to the top of said another leg.

References Cited

UNITED STATES PATENTS

| 2,381,394 | 8/1945 | Beach | 9—8 |
| 2,790,187 | 4/1957 | Marconi | 9—8 |
| 2,847,962 | 8/1958 | Land | 9—8 |
| 3,094,719 | 6/1963 | Nelson | 9—8 |

FOREIGN PATENTS 688,697  3/1953  Great Britain.

REUBEN FRIEDMAN, *Primary Examiner.*

J. DE CESARE, *Assistant Examiner.*